United States Patent [19]

Bryant et al.

[11] Patent Number: 5,531,199

[45] Date of Patent: Jul. 2, 1996

[54] INTERNAL COMBUSTION ENGINES

[75] Inventors: Peter J. Bryant, Oldham; Jacob Epstein, London, both of England

[73] Assignee: United Fuels Limited, London, United Kingdom

[21] Appl. No.: 335,721

[22] PCT Filed: May 10, 1993

[86] PCT No.: PCT/GB93/00955

§ 371 Date: Nov. 10, 1994

§ 102(e) Date: Nov. 10, 1994

[87] PCT Pub. No.: WO93/23662

PCT Pub. Date: Nov. 25, 1993

[30] Foreign Application Priority Data

May 11, 1992 [GB] United Kingdom ............... 92 10 115

[51] Int. Cl.⁶ ..................................... F02M 57/06
[52] U.S. Cl. ........................ 123/297; 123/527; 313/120; 313/125
[58] Field of Search ...................... 123/297, 527, 123/279 E, 526; 137/560; 239/706; 313/120, 125

[56] References Cited

U.S. PATENT DOCUMENTS

| Re. 29,978 | 5/1979 | Leshner et al. | 123/297 |
|---|---|---|---|
| 3,173,409 | 3/1965 | Warren | 313/120 |
| 3,228,185 | 1/1966 | Bergstrom et al. | 313/120 |
| 3,926,169 | 12/1975 | Leshner et al. | |
| 3,980,061 | 9/1976 | McAlister | |
| 4,066,046 | 1/1978 | McAlister | 123/297 |
| 4,095,580 | 6/1978 | Murray et al. | 123/297 |
| 4,267,482 | 5/1981 | Iwata et al. | 313/120 |
| 4,319,552 | 3/1982 | Sauer et al. | 123/297 |
| 4,343,272 | 8/1982 | Buck | |
| 4,448,160 | 5/1984 | Vosper | |
| 4,520,763 | 6/1985 | Lynch et al. | |
| 4,531,497 | 7/1985 | Smith | |
| 4,546,740 | 10/1985 | Clements et al. | 123/297 |
| 4,735,185 | 4/1988 | Imoto et al. | 123/498 |
| 4,736,718 | 4/1988 | Linder | 313/120 |
| 4,811,720 | 3/1989 | Katumata | |
| 5,010,868 | 4/1991 | Clements | |
| 5,052,360 | 10/1991 | Ingle, III | |
| 5,076,244 | 12/1991 | Donaldson | |
| 5,315,981 | 5/1994 | Chen | 123/27 GE |

FOREIGN PATENT DOCUMENTS

| 0211115 | 2/1987 | European Pat. Off. |
|---|---|---|
| 0273846 | 7/1988 | European Pat. Off. |
| 0182952 | 6/1989 | European Pat. Off. |
| 0320959 | 6/1989 | European Pat. Off. |
| 0371759 | 6/1990 | European Pat. Off. |
| 425327 | 5/1991 | European Pat. Off. |
| 484360 | 1/1970 | Switzerland |
| 644951 | 10/1950 | United Kingdom |
| 804024 | 11/1958 | United Kingdom |
| 922938 | 4/1963 | United Kingdom |
| 1002694 | 8/1965 | United Kingdom |
| 1046379 | 10/1966 | United Kingdom |
| 1484691 | 9/1977 | United Kingdom |
| 1547455 | 6/1979 | United Kingdom |
| 2057054 | 3/1981 | United Kingdom |
| 2109860 | 6/1983 | United Kingdom |
| 2227054 | 7/1990 | United Kingdom |
| 0294586 | 12/1991 | United Kingdom |
| 92/05357 | 4/1992 | WIPO |

Primary Examiner—Erick R. Solis
Attorney, Agent, or Firm—Cushman, Darby & Cushman

[57] ABSTRACT

An internal combustion engine in which each cylinder is connected to sources both of air and of fuel held as a gas under pressure and in which the compression stroke, during which a full charge of air is drawn and compressed, is substantially completed before the fuel charge is then admitted and the mixture ignited to start the subsequent power stroke. The fuel may be admitted through a unit doubling as admission valve and igniter, and conventional diesel or gasoline-fuelled engines may be converted by designing that unit to fit into the conventional injector or spark plug holes. The compressed gaseous fuel may be methane, or other natural gas. The invention includes both stationary and mobile engines, especially automobile engines, and methods of operating them.

13 Claims, 4 Drawing Sheets

INTERNAL COMBUSTION ENGINES

BACKGROUND OF THE INVENTION

This invention relates to internal combustion engines of the kind which use, as their source of power, a gaseous fuel stored as a gas. Many such engines have been proposed and used, in both automobile and stationary applications. It has however been common practice in such applications to prepare the charge of air and fuel gas, necessary for each power stroke of the combustion cycle, by mixing the two gaseous constituents in controllable proportions in a manifold upstream of the cylinder, in a manner and at pressures analogous to those in which air and vapourised fuel are premixed in a conventional gasoline-fuelled internal combustion engine. The gas fraction of the mixture thus displaces the equivalent volume of air, so preventing the engine from developing the best power or, if desired, fuel economy. Also, because the fuel gas must be stored at considerable pressure, typically of the order of 250 bar in order to maximise the time interval between refuellings, means must be provided between the tank and the manifold to reduce the pressure of the gas considerably, say to about 70 bar,

SUMMARY OF THE INVENTION

The present invention arises from appreciating a number of potential advantages applicable to that use of pre-compressed gas, particularly compressed natural gas (CNG) as a fuel. Amongst these are firstly admitting the gaseous fuel directly to the cylinder of an internal combustion engine by way of a high pressure line and a variable orifice valve located substantially at the point of entry into the cylinder. Secondly, designing that valve in such a way that it may fit conveniently either into the spark plug hole of a conventional petrol-driven engine or the injector hole of a conventional diesel engine, so facilitating the conversion of either type of engine to operating on fuel stored as compressed gas. Thirdly the possibility of combining, within the admission valve unit, the means to generate a spark and ignite the fuel/air mixture within the cylinder at the start of the power stroke of the combustion cycle, closely following the admission of the gas fuel at the end of the compression stroke once the air has been raised to substantially its maximum pressure. Where CNG is used for fuel, such late admission and ignition is necessary because of the high octane rating of the fuel, and the incorporation of the spark-generating means within the valve unit clearly facilitates the conversion of conventional liquid-fuel internal combustion engines, especially those of diesel type where no such spark-generating means would have been required.

Means for injecting gas from a high pressure line or rail directly into the cylinder of an Internal combustion engine have been described in many prior publications, amongst them Patent Specification EP-A-0425327. The present invention is to be distinguished from that prior publication firstly because the admission valve described in that document does not principally control the admission of fuel to the cylinder. The bulk if not all of the fuel is admitted elsewhere, and the main function of the valve is to control the admission of air, inhibitory gas or the like. Secondly, there is no teaching whatever in EP-A-0425327 of incorporating, within the valve, any possible means to generate a spark. Specification US-A-4520763 does teach the generation of a spark in certain of the illustrated embodiments, but the teaching of this document concentrates upon using only hydrogen as a fuel, and contains no teaching of any need for, or indeed advantage of, admitting the fuel to the cylinder only when the air already there has been compressed to substantially minimum volume. In contrast US-A-3926169 does teach the use of a natural gaseous fuel, such as methane, but again there is no express teaching of any potential advantage of admitting the gaseous fuel to the cylinder during the air-compression stroke, and no teaching at all of advantage in delaying admission until substantially the end of that stroke.

BRIEF DESCRIPTION OF THE DRAWINGS

The invention as defined by the claims, the contents of which are to be read as included within the disclosure of the specification, and embodiments of the invention will now be described by way of example only with reference to the accompanying drawings in which:

DETAILED DESCRIPTION OF THE INVENTION

Figure 1:
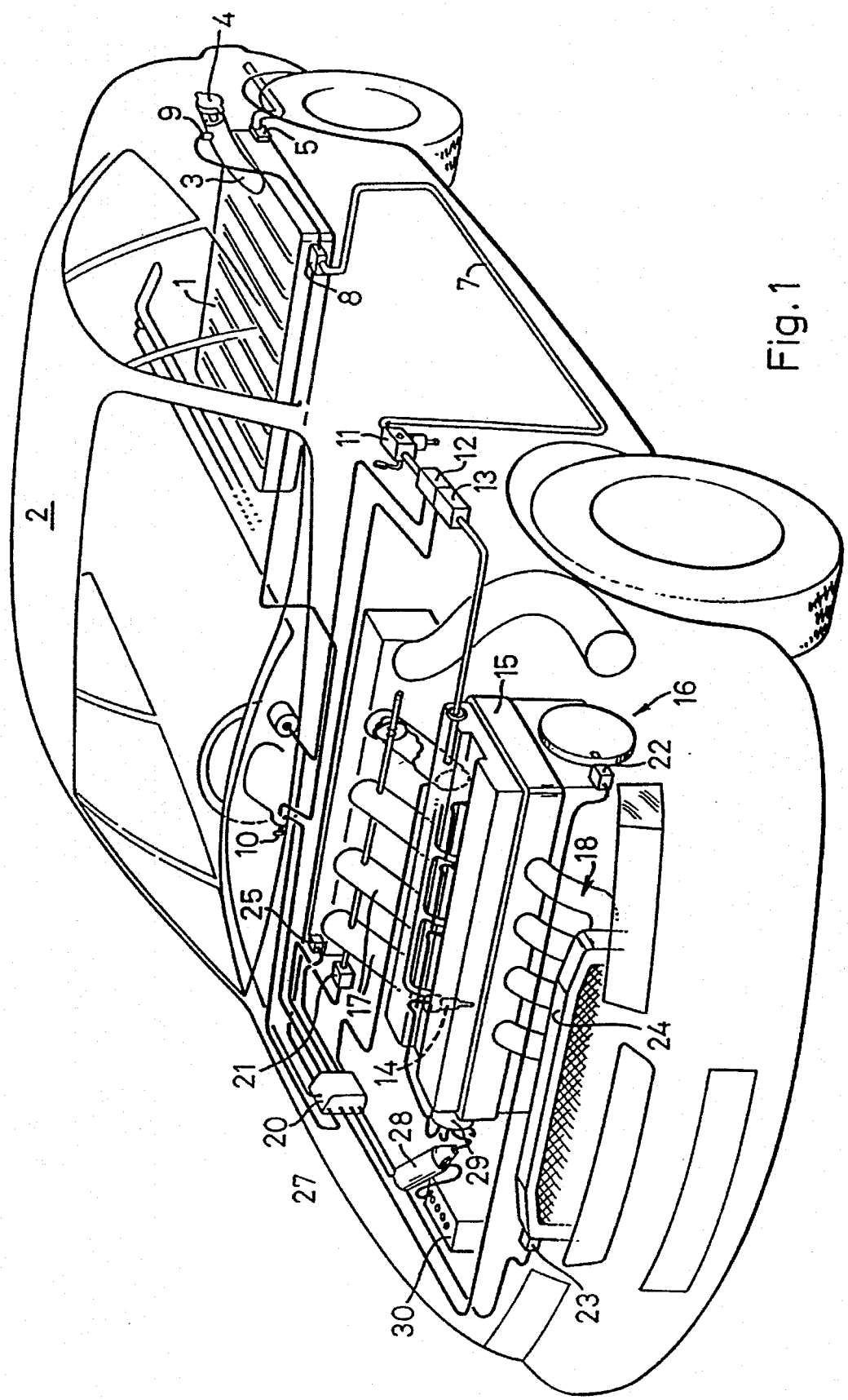
FIG. 1 is a simplified perspective view of a vehicle fitted with an engine according to the invention.

In FIG. 1 a rectangular tank 1, adapted to contain CNG at a typical pressure of say 250 bar, is housed within the rear end of the structure 2 of an automobile vehicle, for instance beneath the floor of the luggage compartment. Tank 1 may be filled from a pressurised CNG supply by way of a filler pipe 3 and bayonet connector 4, and conventional safety features including a safety dump valve 5 are provided. Compressed natural gases, in particular methane, have a number of useful characteristics which make them particularly suitable as fuels for internal combustion engines. One such property of methane is its inherently high octane number (about 130), providing a high specific output and a good anti-detonation factor. Another such property is its high combustion-commencement temperature—about double that of a petroleum/air mixture—which makes it safer in accident and leakage situations. A third advantage of methane is its capacity for very low pollution emission, but to take advantage of this it is necessary to have very accurate control of spark timing, as will be described.

From tank 1 the fuel gas enters a high-pressure gas supply pipe or rail 7, by way of a safety cut-off device 8 which is in circuit with a similar refuelling cut-off 9, both being linked to the vehicle ignition switch 10. Rail 7 leads by way of a manual cut-off 11, pressure sensor 12 and pressure regulator 13 to the injector/igniter devices 14 (of which one is shown in FIG. 1) of the four cylinders (not shown) located within the cylinder block 15 of the engine 16. Although the four cylinders themselves are not shown in FIG. 1, the four inlet ducts 17 and exhaust ducts 18 are.

An electronic control unit 20 will typically receive electrical inputs representing rail gas pressure (as sensed by 12); rail gas temperature (sensor not shown); throttle position (as indicated by sensor 21) linked to butterfly valves in ducts 17; a crankshaft position (as indicated by sensor 22); coolant temperature (as indicated by sensor 23 at radiator 24), and air inlet pressure (indicated by a manifold pressure sensor 25). The ECU 20 is pre-programmed to chosen base line performance curves and other selected characteristics, and the values of the inputs listed above continually modify the pre-programmed information so that the principal output of ECU 20, delivered via line 27 to coil 28 and distributor 29, continuously matches the timing and duration of the opening and sparking of the injectors 14 as called for by the driver.

In practice, further outputs (not shown) of ECU 20 respond to reducing gas pressure in the rail 7 and variations in vehicle altitude and ambient barometric pressure, and to variations in the temperature of the engine coolant and the fuel gas. In general, the ECU 20 is programmed to delivery the stoichiometric mixture strength required to achieve the lowest practicable pollutant levels, and the basic standard settings of the unit will be constantly altered by all the associated sensors connected into the system.

Amongst the safety measures already described, fuel pipe cut-off 8 preferably works so as to cut off the gas supply to rail 7 at any time when refuelling is taking place. This cut-off may for instance comprise an electrically-operated valve working in "fail safe" modes so that any interruption to the electrical power supply automatically closes the valve.

Figure 2:
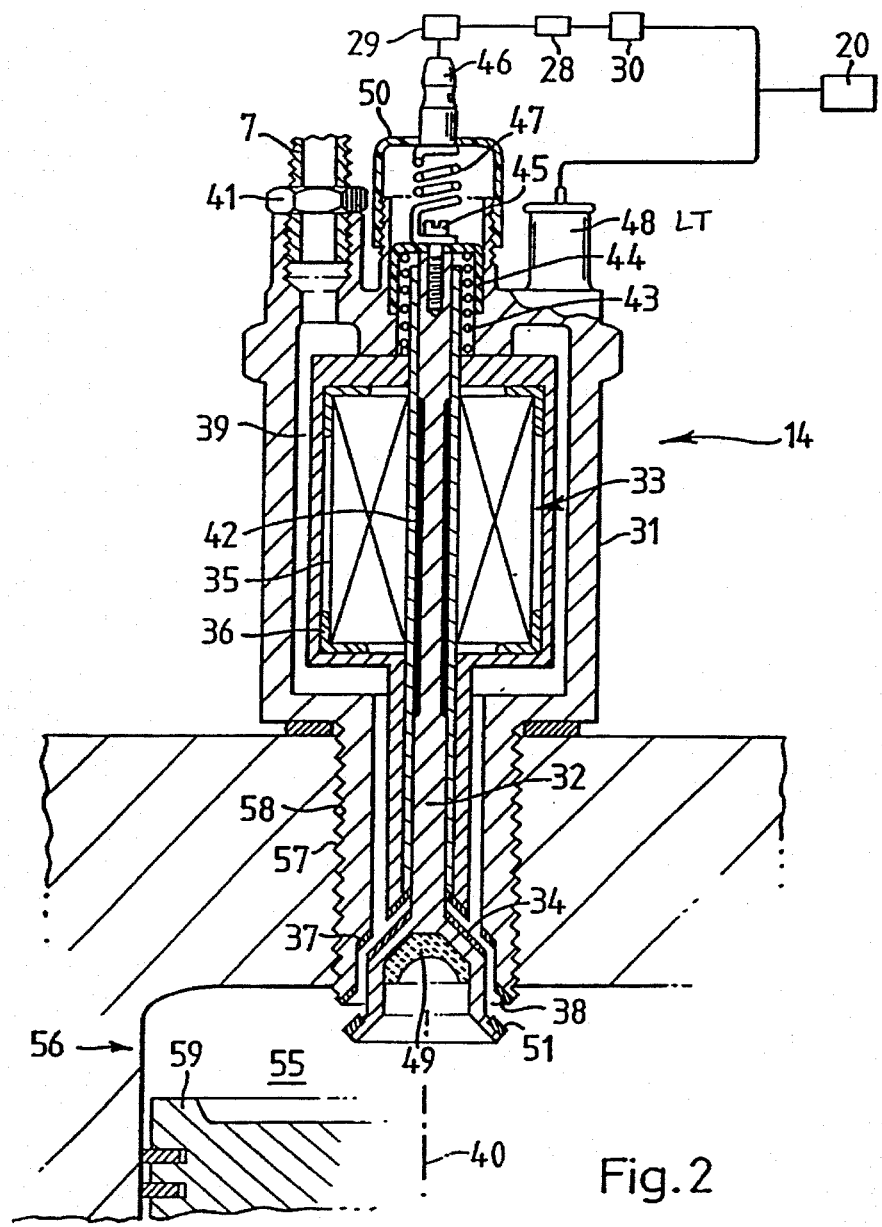
FIG. 2 is an axial section through an injector/igniter for use in such an engine.
Figure 3:
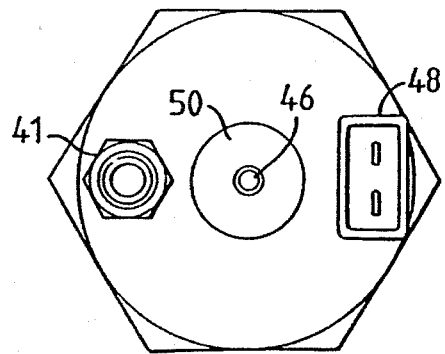
FIG. 3 is a plan view of the same injector/igniter.
Figure 4:
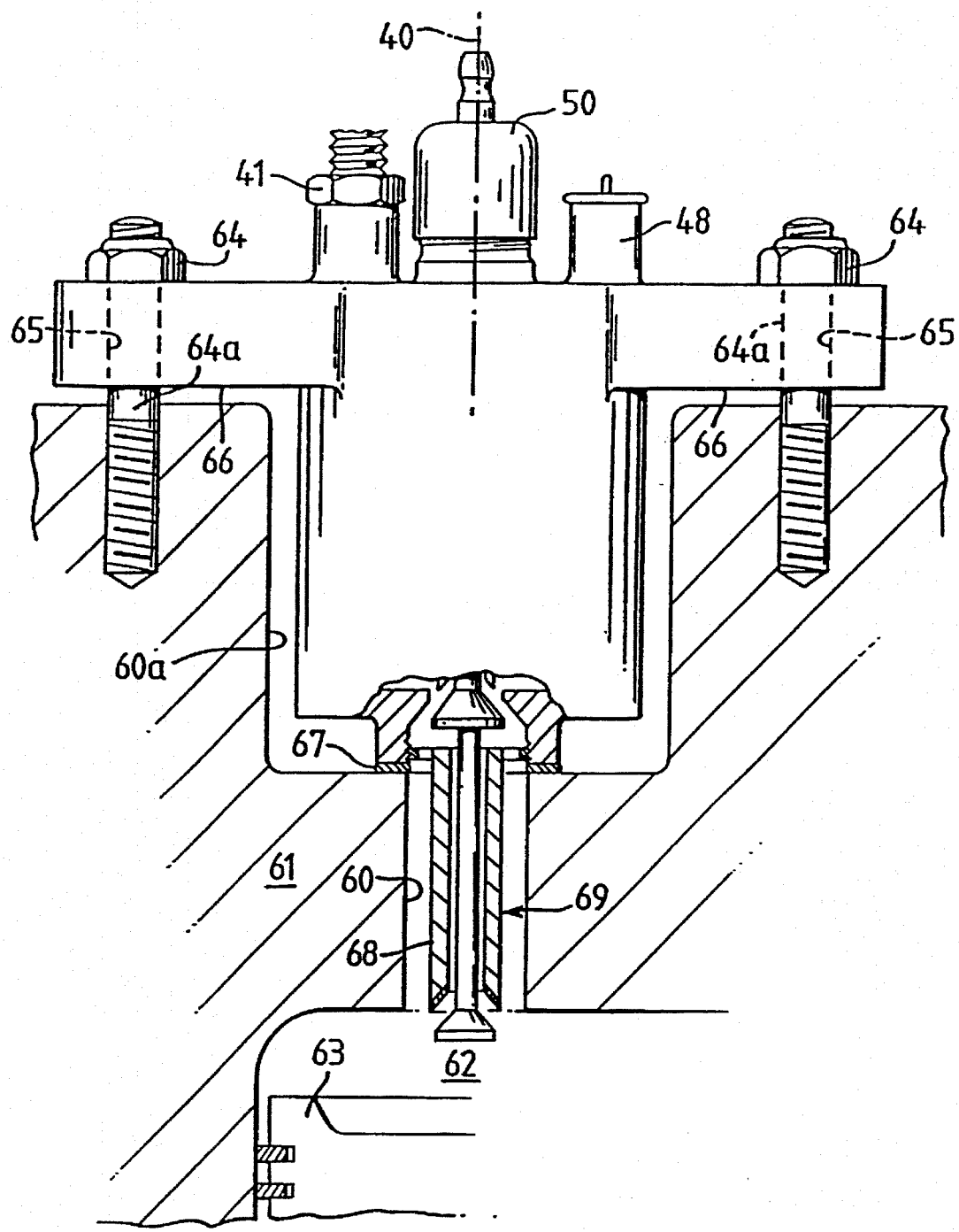
FIG. 4 shows an alternative injector/igniter, and associated parts of a converted diesel engine.

FIGS. 2 to 4 show two possible versions of the injector/igniter (which will be referred to simply as an injector) 14 of FIG. 1 in more detail. In FIGS. 2 and 3 the injector comprises a metallic body 31 in which slides a valve member 32 driven open by a solenoid 33 and closed by a spring 43. The coil 35 of solenoid 33 is positioned and electrically insulated by spacers 36, and the armature of the solenoid is formed by the stem of valve member 32, insulated at the correct area by a ceramic coating 42. Spring 43 bears against a cap 44 of non-conductive material and is attached by way of a fixing screw 45 and spring 47 to an HT connector 46, which passes through a flexible non-conductive cap 50. Connector 46 is in turn connected by way of distributor 29 and coil 28 to the electrical power source 30 of the vehicle. The necessary electrical impulses to activate the solenoid 33 are fed to it from the same power source 30 by way of an LT connector 48, under the control of the ECU 20.

High pressure gas enters the body 31 from rail 7 at a union 41 and flows through an annular passage 39 to the valve clearance which is defined between a ceramic-coated surface 34, formed on valve member 32, and a similar surface 37 formed on body 31. Upon lift of the valve, that is to say when solenoid 33 causes the valve member 32 to descend relative to body 31 so that a gap is opened between 34 and 37, the gas flows through the injector into the cavity 55 of the cylinder 56 (containing a piston 59) of an engine which has been converted from petrol-fuelled operation, the body 31 being screw-threaded (at 57) into the hole 58 previously occupied by a spark plug.

The ECU 20 programmes the engine so that the valve lifts, thereby admitting the CNG at high pressure, only when the piston 59 is on the upwards, compression stroke of its cycle of movement within cylinder 56, when a full charge of air (taken in on the previous intake stroke through the inlet duct 17) is contained and compressed. The ECU 20 typically causes the valve to lift for an appropriate period during that stroke and then, once an appropriate quantity of gas has been injected, to close. The induction air should be compressed to the maximum possible pressure before gas injection, in order to raise Its pre-ignition temperature. The power output of the engine is also increased by this s temperature rise.

Once the valve closes four discharge electrodes 51, mounted at equal angular spacings around the injector axis 40 are now at the correct distance for HT el electrical discharge from four corresponding electrodes 38 located on the lower end of valve body 31. An HT discharge initiated by ECU 20 now ignites the fuel air mixture within cavity 55 and begins the power stroke of the cycle. The characteristics of a heat sink 49, mounted in the lower end of valve member 32, may be chosen to al low for differing degrees of residual heat, and thus accommodate a variety of types and dimensions of internal combustion engine into which the injector may be fitted. The advance of the flame front, following ignition, also tends to be assisted by high compression of the air before gas injection, so as to raise its pre-ignition temperature in the manner described in the preceding paragraph. In a typical reciprocating-piston internal combustion engine, in which a connecting rod joins each piston to a crank of the crankshaft, as is well known the compression stoke occupies 180° of crankshaft rotation, at the end of which the piston is at top dead centre (TDC). In such an engine the requirement of this invention for the induction air to be well compressed before gas injection is promoted by substantially confining that injection to the part of the compression stroke coinciding with the final 20°, and preferably the final 10°, of crankshaft rotation before TDC. In a typical, medium-capacity automobile engine, confining the gas injection to this arc of crankshaft rotation means that the pressure of the compressed air within the cylinder when injection begins may be within the range about 600–1000 psi.

The strength of the gas/air mixture, present in the cylinder at the moment of ignition, is varied by the duration of the opening of the valve member 32, as called for by ECU 20 and solenoid 33. That duration is typically very short within a range of say 3–17 ms, comparable with that of the fuel-injection system of a contemporary racing car. High pressure in the gas line, right up to the valve 32, makes this short duration possible, and the accuracy of the duration is promoted by the simple construction and control of the valve which has only two positions, either fully open when solenoid 33 is energised, or fully and quickly closed by return spring 43 as soon as the solenoid is de-energised. Through the ECU 20 the opening duration of the valve is typically modified In accordance with the ambient air temperature and pressure, cylinder head temperature, oxygen content of the exhaust gas and throttle position, the latter representing the power demanded by the driver. Through the ECU 20 the exact moment of ignition is typically determined principally by the position of the engine crankshaft and the instantaneous engine rpm. Precise control of ignition prevents detonation especially when operating at lean mixtures. Hence the desirability of triggering the operating data from the crankshaft position rather than from any part of the camshaft drive or other components which might be subject to variance from the true crankshaft position.

While generally similar to the corresponding item in FIGS. 2 and 3, the details of the injector of FIG. 4 are chosen so that it may fit into what was previously the injector hole 60 formed at the base of a recess 60a in the deep head 61 of the cylinder 62 (containing a piston 63) of a converted diesel engine. Instead of screwing into the hole 60, the injector body 31 is now attached to the cylinder structure by nuts 64 and studs 64a passing through holes 65 formed in arms 66 projecting from the body, and a seal between the injector and the cylinder structure is made by a ring gasket 67. There is now greater axial separation between the gas valve (34/37) and the spark gap (51/38), to match the greater depth of the diesel cylinder head 61, and the injector hole 60 will usually be of smaller radius than the spark plug hole 58 of FIGS. 2 and 3. 14hen the gas valve 34/37 is open, the gas passing through that valve may then travel on into the cylinder 62 both through an outer annular passage between the injector hole wall and the outer surface 68 of the detachable lower member 69 of metallic body 31, and through an inner passage between member 69 and the lower part of the stem of valve member 32. Again, when gas valve 34/37 is closed, electrodes 51 and 38 are at the right spacing for a spark.

The injector of FIG. 4 could be fitted with gas swirl guides, to direct the fuel gas accurately as it emerges from hole 60 into the cavity of cylinder 62. Such accuracy would be possible because the fastening by the nuts 64 and studs 64a ensures only one possible angular orientation (about axis 40) of the injector relative to the cylinder 62.

Figure 5:
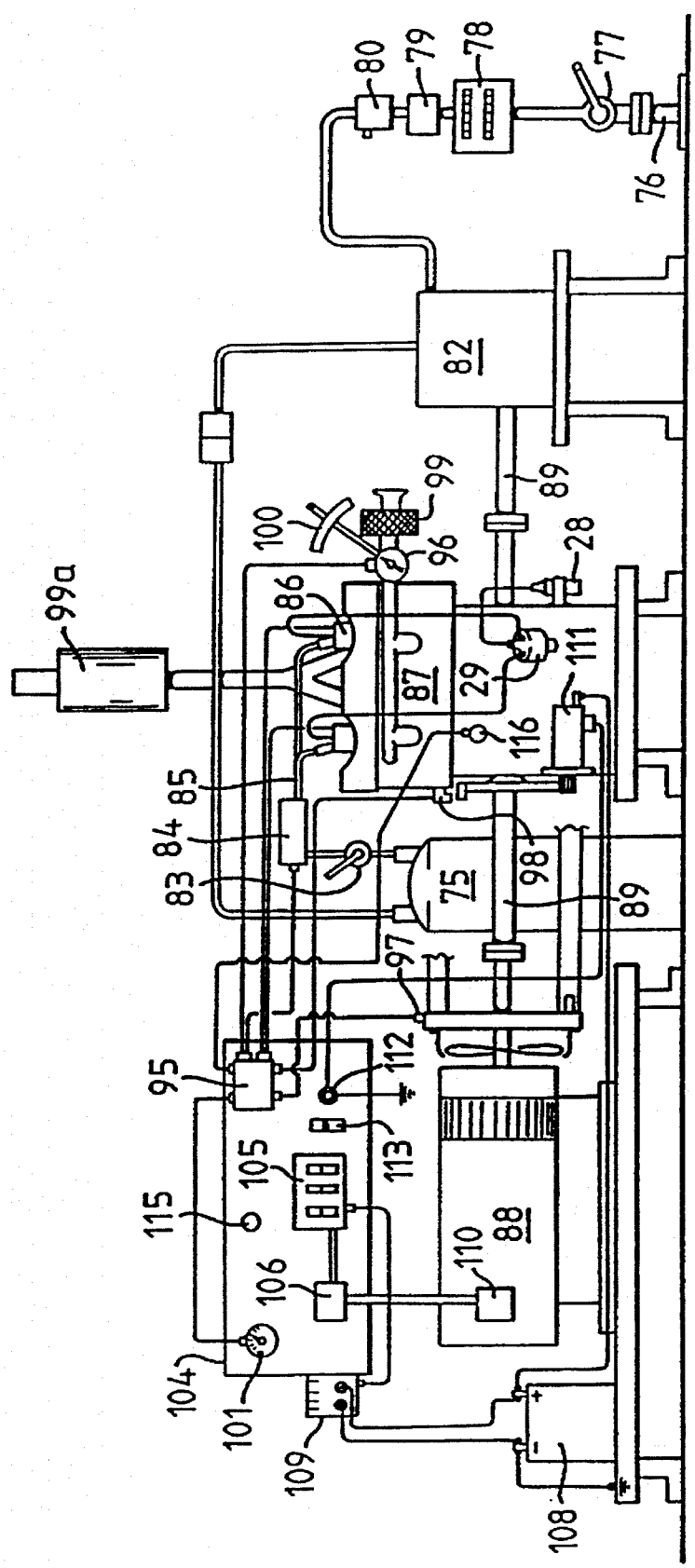
FIG. 5 shows in outline the layout of a stationary power generating unit using an engine according to the invention.

FIG. 5 shows a stationary power generating unit according to the invention. Gas admitted from a mains supply at 76 passes through a manual shut-off valve 77 into a meter 78 recording gas used, and thence to a non-return valve 79 and low pressure switch 80. The valve 79 will protect the meter 78 and the mains supply 76 against blow-back, and the switch 80 will automatically stop the unit if mains supply pressure falls below a certain value.

The gas now passes into a compressor 82 where it is brought up to high pressure and delivered into a small storage tank 75. This serves both to dampen out any fluctuation in mains pressure and to provide sufficient stored high-pressure gas to start the unit going after being out of use for some time. The tank 75, like the tank 1 of FIG. 1, thus ensures a source of high-pressure gas. From the tank 75 the high-pressure gas passes through another manual shut-off valve 83 into a regulator 84 which lowers the pressure to the design value of a fuel rail 85 which distributes gas at that design pressure to injector/ignitor units 86 and thence into the combustion chambers of an engine 87, which drives both a generator 88 and the compressor 82 by way of a common shaft 89.

Engine 87 is governed by an electronic control unit 95, comparable to unit 20 of FIG. 1, which receives input data from sources including a throttle position indicator 96 coolant temperature indicator 97 and crankshaft position indicator 98 to provide the most efficient combustion. The intake to engine 87 is filtered and silenced at 99, and the exhaust filter/silencer is shown at 99a. Engine rotary speed is set as desired by a manual lever 100 and indicated on a gauge 101, and once set is monitored and corrected continuously by the ECU 95.

A distribution board 104 supports all the electrical outputs 105 of the generator 88, and has a main isolator 106. Also mounted on board 104 is a low voltage starting system comprising a storage battery 108 kept charged by a charger 109 fed from a high voltage supply 110 and feeding current to the engine starter 111 when activated by a starter button 112. Engine 87 may be stopped manually by ignition switch 113. If engine 87 were to overheat the ECU 95 would reduce power to idle, and if the pressure of the mains gas supply at 76 falls too low the ECU is programmed to cut off the ignition. The ECU is also programmed to cut off the ignition if oil pressure within the system, indicated on board 104 by a gauge 115, fails as indicated by a sensor 116.

It will be apparent that other mechanisms, driven by the engine 87, could be substituted for the generator 88, for example a liquid pump or an air compressor.

We claim:

1. An internal combustion engine including at least one piston-and-cylinder combination, in which said cylinder is connected in use both to a source of air and to a source of fuel held as a gas under pressure, in which the engine operates a combustion cycle including a compression stroke in which the cylinder compresses a full charge of air, and in which the compression stroke is then substantially completed before gaseous fuel is admitted to the cylinder from the fuel source, and an air/fuel mixture is subsequently ignited to initiate a power stroke, characterized in that the cylinder is disconnected from the fuel source before the air/fuel mixture is ignited, and in that substantially all the gaseous fuel is admitted to the cylinder through a unit which carries electrodes of an igniter, said unit including an admission valve having a member which carries at least one of said electrodes, in which said unit comprises two parts which are capable of a predetermined range of relative movement, in which at least one pair of said electrodes for generating an ignition spark are mounted with the two electrodes of the pair carried one on each of the two parts, in which when the two parts are at one end of their range of relative movement the admission valve is shut and the two electrodes are at the correct relative spacing for ignition, and in which as the two parts move towards the other end of the range of movement the spacing between the two electrodes changes.

2. An engine according to claim 1 in which the piston is of reciprocating type.

3. An engine according to claim 1, in which the admission valve by which the fuel is admitted to the cylinder is a power-driven one, and in which opening of the valve is caused by activation of the source of the power.

4. An engine according to claim 3 in which the admission valve is adapted for operation in two conditions—fully-open or fully-closed—only.

5. A engine according to claim 4 in which a return spring biases the admission valve to the fully-closed position whenever power is not applied.

6. An engine according to claim 1 in which the cylinder is of conventional type for a gasoline-fueled engine, including a hole for a spark plug, and said unit fits into said hole.

7. An engine according to claim 1 in which the cylinder is of conventional type for a compression-ignition engine using diesel fuel, and includes a hole for an injector, and in which said unit fits into said injector hole.

8. An engine according to any one of the preceding claims, adapted to use compressed natural gas (CNG) for fuel.

9. An engine according to claim 1 in which the pressure rise resulting from the ignition of the air-fuel mixture acts to urge said admission valve towards its closed position.

10. An engine according to claim 1 in which the admission valve also carries heat sink means to allow for differing degrees of residual head so as to widen the range of types and dimensions of engines to which the admission valve may be fitted.

11. An engine according to claim 1 including a crankshaft, and in which means to time the ignition are triggered directly from crankshaft position.

12. An automobile vehicle including an internal combustion engine including at least one piston-and-cylinder combination, in which such a cylinder is connected in use both to a source of air and to a source of fuel held as a gas under pressure, in which the engine operates a combustion cycle including a compression stroke in which the cylinder compresses a full charge of air, and in which the compression stroke is then substantially completed before gaseous fuel is admitted to the cylinder from the fuel source, and an air/fuel mixture is subsequently ignited to initiate a power stroke, characterized in that the cylinder is disconnected from the fuel source before the air/fuel mixture is ignited, and in that substantially all the gaseous fuel is admitted to the cylinder through a unit which carries electrodes of an igniter, said unit including an admission valve having a member which carries at least one of said electrodes, in which said unit comprises two parts which are capable of a predetermined range of relative movement, in which at least one pair of said electrodes for generating an ignition spark are mounted with the two electrodes of the pair carried one on each of the two parts, in which when the two parts are at one end of their range of relative movement the admission valve is shut and the two electrodes are at the correct relative spacing for ignition, and in which as the two parts move towards the other end of the range of movement the spacing between the two electrodes changes; and

- storage means to store fuel in gaseous form at high pressure.

13. A stationary power-generating unit comprising: a compressor for gaseous fuel;

- an internal combustion engine including at least one piston-and-cylinder combination, in which such a cylinder is connected in use both to a source of air and to a source of fuel held as a gas under pressure, in which the engine operates a combustion cycle including a compression stroke in which the cylinder compresses a full charge of air, and in which the compression stroke is then substantially completed before gaseous fuel is admitted to the cylinder from the fuel source, and an air/fuel mixture is subsequently ignited to initiate a power stroke, characterized in that the cylinder is disconnected from the fuel source before the air/fuel mixture is ignited, and in that substantially all the gaseous fuel is admitted to the cylinder through a unit which carries electrodes of an igniter, said unit including an admission valve having a member which carries at least one of said electrodes, in which said unit comprises two parts which are capable of a predetermined range of relative movement, in which at least one pair of said electrodes for generating an ignition spark are mounted with the two electrodes of the pair carried one on each of the two parts, in which when the two parts are at one end of their range of relative movement the admission valve is shut and the two electrodes are at the correct relative spacing for ignition, and in which as the two parts move towards the other end of the range of movement the spacing between the two electrodes changes; and power delivery means, in which the engine drives both the compressor and the power delivery means.

* * * * *